(12) United States Patent
Hanna et al.

(10) Patent No.: US 9,384,476 B2
(45) Date of Patent: *Jul. 5, 2016

(54) MONEY TRANSFER SYSTEM AND METHOD

(71) Applicant: The Western Union Company, Englewood, CO (US)

(72) Inventors: Assaad G. Hanna, San Francisco, CA (US); Kurt L. Hansen, Parker, CO (US); Dean A. Seifert, Dublin (IE)

(73) Assignee: The Western Union Company, Englewood, CO (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/216,055

(22) Filed: Mar. 17, 2014

(65) Prior Publication Data
US 2014/0344089 A1 Nov. 20, 2014

Related U.S. Application Data

(63) Continuation of application No. 11/240,755, filed on Sep. 30, 2005, now Pat. No. 8,672,220.

(51) Int. Cl.
*G06Q 20/12* (2012.01)
*G06Q 20/10* (2012.01)
(Continued)

(52) U.S. Cl.
CPC .............. *G06Q 20/10* (2013.01); *G06Q 20/12* (2013.01); *G06Q 20/202* (2013.01);
(Continued)

(58) Field of Classification Search
CPC ..... G06Q 20/347; G06Q 20/10; G06Q 20/12; G06Q 20/202; G06Q 20/204; G07F 7/02; G07F 7/42; G07F 7/0866; G07F 7/1008; G07F 7/12; G07G 5/00
See application file for complete search history.

(56) References Cited

U.S. PATENT DOCUMENTS 3,599,151 A   8/1971   Harr
3,783,755 A   1/1974   Lagin
(Continued)

FOREIGN PATENT DOCUMENTS

EP   481135 A1   4/1992
EP   949596 A2   10/1999
(Continued)

OTHER PUBLICATIONS

Author Unknown, "GiftSpot.com Simplifies gift-Giving on the Internet," PR Newswire, Oct. 20, 1999, retrieved from PROQUEST database on May 1, 2002, 5 pages.
(Continued)

*Primary Examiner* — Daniel Walsh
(74) *Attorney, Agent, or Firm* — Kilpatrick Townsend & Stockton LLP

(57) ABSTRACT

A method for transferring money may include providing a money transfer instrument having product information and a monetary value associated therewith. The method may also include capturing the product information by a POS terminal in response to the sender purchasing the money transfer instrument. The method may further include generating and issuing a personal identifier to the sender on a receipt printed at the POS terminal. The method may additionally include receiving from the sender money transfer information along with the personal identifier. The method may moreover include generating and transmitting to the sender a money transfer control identifier that is separate from the personal identifier. The method may furthermore include receiving from the recipient the money transfer control identifier to receive transferred money at a money transfer location.

20 Claims, 6 Drawing Sheets

(51) Int. Cl.
  *G06Q 20/34* (2012.01)
  *G06Q 20/20* (2012.01)
  *G07F 7/02* (2006.01)
  *G07F 17/42* (2006.01)
  *G07F 7/08* (2006.01)
  *G07F 7/10* (2006.01)
  *G07F 7/12* (2006.01)
  *G07G 5/00* (2006.01)

(52) U.S. Cl.
  CPC .......... *G06Q 20/204* (2013.01); *G06Q 20/209* (2013.01); *G06Q 20/3437* (2013.01); *G07F 7/02* (2013.01); *G07F 7/0866* (2013.01); *G07F 7/1008* (2013.01); *G07F 7/12* (2013.01); *G07F 17/42* (2013.01); *G07G 5/00* (2013.01)

(56) References Cited

U.S. PATENT DOCUMENTS

| | | | |
|---|---|---|---|
| 3,833,395 | A | 9/1974 | Gosnell |
| 4,032,931 | A | 6/1977 | Haker |
| 4,321,672 | A | 3/1982 | Braun et al. |
| 4,385,285 | A | 5/1983 | Horst et al. |
| 4,454,414 | A | 6/1984 | Benton |
| 4,562,340 | A | 12/1985 | Tateisi et al. |
| 4,562,341 | A | 12/1985 | Ohmae et al. |
| 4,630,200 | A | 12/1986 | Ohmae et al. |
| 4,678,895 | A | 7/1987 | Tateisi et al. |
| 4,722,554 | A | 2/1988 | Pettit |
| 4,795,892 | A | 1/1989 | Gilmore et al. |
| 4,812,628 | A | 3/1989 | Boston et al. |
| 4,823,264 | A | 4/1989 | Deming |
| 4,829,168 | A | 5/1989 | Nakahara |
| 4,902,881 | A | 2/1990 | Janku |
| 4,961,142 | A | 10/1990 | Elliott et al. |
| 4,972,318 | A | 11/1990 | Brown et al. |
| 5,021,967 | A | 6/1991 | Smith |
| 5,053,607 | A | 10/1991 | Carlson et al. |
| 5,119,293 | A | 6/1992 | Hammond |
| 5,175,682 | A | 12/1992 | Higashiyama et al. |
| 5,220,501 | A | 6/1993 | Lawlor et al. |
| 5,233,167 | A | 8/1993 | Markman et al. |
| 5,283,829 | A | 2/1994 | Anderson |
| 5,350,906 | A | 9/1994 | Brody et al. |
| 5,367,452 | A | 11/1994 | Gallery et al. |
| 5,408,077 | A | 4/1995 | Campo et al. |
| 5,426,594 | A | 6/1995 | Wright et al. |
| 5,448,043 | A | 9/1995 | Nakano et al. |
| 5,461,217 | A | 10/1995 | Claus |
| 5,464,971 | A | 11/1995 | Sutcliffe et al. |
| 5,465,206 | A | 11/1995 | Hilt et al. |
| 5,477,037 | A | 12/1995 | Berger |
| 5,477,038 | A | 12/1995 | Levine et al. |
| 5,484,988 | A | 1/1996 | Hills et al. |
| 5,491,325 | A | 2/1996 | Huang et al. |
| 5,504,677 | A | 4/1996 | Pollin |
| 5,510,979 | A | 4/1996 | Moderi et al. |
| 5,513,117 | A | 4/1996 | Small |
| 5,524,073 | A | 6/1996 | Stambler |
| 5,546,523 | A | 8/1996 | Gatto |
| 5,550,734 | A | 8/1996 | Tarter et al. |
| 5,555,496 | A | 9/1996 | Tackbary et al. |
| 5,557,516 | A | 9/1996 | Hogan |
| 5,570,465 | A | 10/1996 | Tsakanikas |
| 5,577,109 | A | 11/1996 | Stimson et al. |
| 5,604,802 | A | 2/1997 | Holloway |
| 5,616,902 | A | 4/1997 | Cooley et al. |
| 5,622,388 | A | 4/1997 | Alcordo |
| 5,629,982 | A | 5/1997 | Micali |
| 5,638,283 | A | 6/1997 | Herbert |
| 5,649,117 | A | 7/1997 | Landry |
| 5,650,604 | A * | 7/1997 | Marcous ................ G06Q 20/10 235/379 |
| 5,657,201 | A | 8/1997 | Kochis |
| 5,677,955 | A | 10/1997 | Doggett et al. |
| 5,679,940 | A | 10/1997 | Templeton et al. |
| 5,686,713 | A | 11/1997 | Rivera |
| 5,699,528 | A | 12/1997 | Hogan |
| 5,717,868 | A | 2/1998 | James |
| 5,721,768 | A | 2/1998 | Stimson et al. |
| 5,732,136 | A | 3/1998 | Murphree et al. |
| 5,732,400 | A | 3/1998 | Mandler et al. |
| 5,745,886 | A | 4/1998 | Rosen |
| 5,757,917 | A | 5/1998 | Rose et al. |
| 5,764,888 | A | 6/1998 | Bolan et al. |
| 5,774,879 | A | 6/1998 | Custy et al. |
| 5,777,305 | A | 7/1998 | Smith et al. |
| 5,778,067 | A | 7/1998 | Jones et al. |
| 5,779,379 | A | 7/1998 | Mason et al. |
| 5,783,808 | A | 7/1998 | Josephson |
| 5,787,403 | A | 7/1998 | Randle |
| 5,794,207 | A | 8/1998 | Walker et al. |
| 5,799,072 | A | 8/1998 | Vulcan et al. |
| 5,806,045 | A | 9/1998 | Blorge et al. |
| 5,815,657 | A | 9/1998 | Williams et al. |
| 5,825,617 | A | 10/1998 | Kochis et al. |
| 5,826,241 | A | 10/1998 | Stein et al. |
| 5,828,875 | A | 10/1998 | Halvarsson et al. |
| 5,832,457 | A | 11/1998 | O'Brien et al. |
| 5,832,463 | A | 11/1998 | Funk |
| 5,859,419 | A | 1/1999 | Wynn |
| 5,865,470 | A | 2/1999 | Thompson |
| 5,868,236 | A | 2/1999 | Rademacher |
| 5,870,718 | A | 2/1999 | Spector |
| 5,875,435 | A | 2/1999 | Brown |
| 5,878,211 | A | 3/1999 | Delagrange et al. |
| 5,880,446 | A | 3/1999 | Mori et al. |
| 5,893,080 | A | 4/1999 | McGurl et al. |
| 5,896,298 | A | 4/1999 | Richter |
| 5,897,625 | A | 4/1999 | Gustin et al. |
| 5,897,989 | A | 4/1999 | Beecham |
| 5,898,154 | A | 4/1999 | Rosen |
| 5,899,980 | A | 5/1999 | Wilf et al. |
| 5,899,982 | A | 5/1999 | Randle |
| 5,902,983 | A | 5/1999 | Crevelt et al. |
| 5,903,633 | A | 5/1999 | Lorsch |
| 5,903,880 | A | 5/1999 | Biffar |
| 5,903,881 | A | 5/1999 | Schrader et al. |
| 5,909,492 | A | 6/1999 | Payne et al. |
| 5,909,673 | A | 6/1999 | Gregory |
| 5,910,988 | A | 6/1999 | Ballard |
| 5,913,202 | A | 6/1999 | Motoyama |
| 5,915,023 | A | 6/1999 | Bernstein |
| 5,920,629 | A | 7/1999 | Rosen |
| 5,920,847 | A | 7/1999 | Kolling et al. |
| 5,920,848 | A | 7/1999 | Schutzer et al. |
| 5,923,016 | A | 7/1999 | Fredregill et al. |
| 5,937,396 | A | 8/1999 | Konya |
| 5,949,044 | A | 9/1999 | Walker et al. |
| 5,952,639 | A | 9/1999 | Ohki et al. |
| 5,953,709 | A | 9/1999 | Gilbert et al. |
| 5,953,710 | A | 9/1999 | Fleming |
| 5,960,412 | A | 9/1999 | Tackbary et al. |
| 5,963,647 | A * | 10/1999 | Downing ................ G06Q 20/04 235/379 |
| 5,974,146 | A | 10/1999 | Randle et al. |
| 5,974,194 | A | 10/1999 | Hirani et al. |
| RE36,365 | E | 11/1999 | Levine et al. |
| 5,978,780 | A | 11/1999 | Watson |
| 5,987,426 | A | 11/1999 | Goodwin, III |
| 5,991,748 | A | 11/1999 | Taskett |
| 5,993,047 | A | 11/1999 | Novogrod et al. |
| 5,999,624 | A | 12/1999 | Hopkins |
| 6,003,763 | A | 12/1999 | Gallagher et al. |
| 6,011,833 | A | 1/2000 | West |
| 6,012,048 | A | 1/2000 | Gustin et al. |
| 6,015,087 | A | 1/2000 | Seifert et al. |
| 6,018,724 | A | 1/2000 | Arent |
| 6,027,216 | A | 2/2000 | Guyton |
| 6,029,150 | A | 2/2000 | Kravitz |
| 6,030,000 | A | 2/2000 | Diamond |
| 6,032,133 | A | 2/2000 | Hilt et al. |
| 6,032,136 | A | 2/2000 | Brake, Jr. et al. |

(56) References Cited

U.S. PATENT DOCUMENTS

| | | |
|---|---|---|
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,052,674 A | 4/2000 | Zervides et al. |
| 6,058,417 A | 5/2000 | Hess et al. |
| 6,061,799 A | 5/2000 | Eldridge et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,073,121 A | 6/2000 | Ramzy |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,104,815 A | 8/2000 | Alcorn et al. |
| 6,106,020 A | 8/2000 | Leef et al. |
| 6,119,106 A | 9/2000 | Mersky et al. |
| 6,119,931 A | 9/2000 | Novogrod |
| 6,119,933 A | 9/2000 | Wong et al. |
| 6,122,625 A | 9/2000 | Rosen |
| 6,128,602 A | 10/2000 | Northington et al. |
| 6,128,603 A | 10/2000 | Dent et al. |
| 6,129,275 A | 10/2000 | Urquhart et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,149,057 A * | 11/2000 | Hollis ............................ 235/379 |
| 6,164,528 A | 12/2000 | Hills et al. |
| 6,167,386 A | 12/2000 | Brown |
| 6,175,823 B1 | 1/2001 | Van Dusen |
| 6,178,409 B1 | 1/2001 | Weber et al. |
| 6,189,787 B1 | 2/2001 | Dorf |
| 6,193,152 B1 | 2/2001 | Fernando et al. |
| 6,193,155 B1 | 2/2001 | Walker et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |
| 6,216,227 B1 | 4/2001 | Goldstein et al. |
| 6,223,166 B1 | 4/2001 | Kay |
| 6,223,168 B1 | 4/2001 | McGurl et al. |
| 6,246,996 B1 | 6/2001 | Stein et al. |
| 6,247,047 B1 | 6/2001 | Wolff |
| 6,260,024 B1 | 7/2001 | Shkedy |
| 6,263,446 B1 | 7/2001 | Kausik et al. |
| 6,269,369 B1 | 7/2001 | Robertson |
| 6,275,829 B1 | 8/2001 | Angiulo et al. |
| 6,282,522 B1 | 8/2001 | Davis et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,304,960 B1 | 10/2001 | Yeh et al. |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,321,987 B1 | 11/2001 | Watanabe et al. |
| 6,327,348 B1 | 12/2001 | Walker et al. |
| 6,327,570 B1 | 12/2001 | Stevens |
| 6,327,575 B1 | 12/2001 | Katz |
| 6,334,108 B1 | 12/2001 | Deaton et al. |
| 6,343,279 B1 | 1/2002 | Bissonette et al. |
| 6,347,305 B1 | 2/2002 | Watkins |
| 6,360,254 B1 | 3/2002 | Linden et al. |
| 6,367,693 B1 | 4/2002 | Novogrod |
| 6,370,240 B1 | 4/2002 | Woynoski et al. |
| 6,381,582 B1 | 4/2002 | Walker et al. |
| 6,386,444 B1 | 5/2002 | Sullivan |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,745 B1 | 1/2003 | Stimson et al. |
| 6,502,747 B1 | 1/2003 | Stoutenburg et al. |
| 6,510,453 B1 | 1/2003 | Apfel et al. |
| 6,526,130 B1 | 2/2003 | Paschini |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,575,358 B2 | 6/2003 | O'Callaghan et al. |
| 6,601,038 B1 | 7/2003 | Kolls |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B2 | 5/2004 | Cooper et al. |
| 6,738,749 B1 | 5/2004 | Chasko |
| 6,761,309 B2 | 7/2004 | Stoutenburg et al. |
| 6,761,311 B1 | 7/2004 | Algiene et al. |
| 6,805,289 B2 | 10/2004 | Noriega et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,854,651 B2 | 2/2005 | Smith et al. |
| 6,886,741 B1 | 5/2005 | Salveson |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 6,938,013 B1 | 8/2005 | Gutierrez-Sheris |
| 7,092,916 B2 | 8/2006 | Diveley et al. |
| 7,103,577 B2 | 9/2006 | Blair et al. |
| 7,104,440 B2 | 9/2006 | Hansen et al. |
| 7,107,249 B2 | 9/2006 | Dively et al. |
| 7,158,955 B2 | 1/2007 | Diveley et al. |
| 7,182,252 B1 | 2/2007 | Cooper et al. |
| 7,195,151 B2 | 3/2007 | Licciardello et al. |
| 7,398,252 B2 | 7/2008 | Neofytides et al. |
| 7,424,970 B2 * | 9/2008 | Royce-Winston ............ 235/379 |
| 7,469,224 B2 | 12/2008 | Foss, Jr. |
| 7,641,109 B2 | 1/2010 | Seifert et al. |
| 7,865,432 B2 | 1/2011 | Doran et al. |
| 7,933,835 B2 | 4/2011 | Keane et al. |
| 8,038,058 B2 | 10/2011 | Licciardello et al. |
| 8,152,054 B2 | 4/2012 | Bulawa et al. |
| 8,504,473 B2 | 8/2013 | Paintin et al. |
| 8,672,220 B2 * | 3/2014 | Hanna et al. ................... 235/379 |
| 2001/0032878 A1 | 10/2001 | Tsiounis et al. |
| 2001/0051876 A1 | 12/2001 | Seigel et al. |
| 2001/0054003 A1 | 12/2001 | Chien et al. |
| 2002/0007320 A1 | 1/2002 | Hogan et al. |
| 2002/0016769 A1 | 2/2002 | Barbara et al. |
| 2002/0023055 A1 | 2/2002 | Antognini et al. |
| 2002/0032653 A1 | 3/2002 | Schutzer |
| 2002/0046106 A1 | 4/2002 | Ishibashi et al. |
| 2002/0046116 A1 | 4/2002 | Hohle et al. |
| 2002/0055911 A1 | 5/2002 | Guerreri |
| 2002/0062285 A1 | 5/2002 | Amann |
| 2002/0076018 A1 | 6/2002 | Banks et al. |
| 2002/0077976 A1 | 6/2002 | Meyer et al. |
| 2002/0082931 A1 | 6/2002 | Siegel et al. |
| 2002/0082962 A1 * | 6/2002 | Farris ..................... G06Q 30/06 705/35 |
| 2002/0087337 A1 | 7/2002 | Hensley |
| 2002/0087462 A1 * | 7/2002 | Seifert ................... G06Q 20/04 705/39 |

(56) References Cited

U.S. PATENT DOCUMENTS

| | | |
|---|---|---|
| 2002/0087463 A1 | 7/2002 | Fitzgerald et al. |
| 2002/0087467 A1 | 7/2002 | Mascavage et al. |
| 2002/0087469 A1 | 7/2002 | Ganesan et al. |
| 2002/0099652 A1* | 7/2002 | Herzen ............... G06Q 20/02 705/39 |
| 2002/0104026 A1 | 8/2002 | Barra et al. |
| 2002/0104878 A1 | 8/2002 | Seifert et al. |
| 2002/0111908 A1 | 8/2002 | Milberger et al. |
| 2002/0143566 A1* | 10/2002 | Diveley ............................. 705/1 |
| 2002/0143706 A1 | 10/2002 | Diveley et al. |
| 2002/0143709 A1* | 10/2002 | Diveley ........................... 705/74 |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2002/0169719 A1 | 11/2002 | Dively et al. |
| 2002/0174016 A1 | 11/2002 | Cuervo |
| 2002/0185529 A1* | 12/2002 | Cooper et al. ................ 235/380 |
| 2002/0195486 A1* | 12/2002 | Erb et al. ...................... 235/379 |
| 2003/0001005 A1 | 1/2003 | Risafi et al. |
| 2003/0014371 A1 | 1/2003 | Turgeon |
| 2003/0024979 A1 | 2/2003 | Hansen et al. |
| 2003/0028491 A1 | 2/2003 | Cooper |
| 2003/0041022 A1* | 2/2003 | Battle et al. .................... 705/39 |
| 2003/0053609 A1 | 3/2003 | Risafi et al. |
| 2003/0055689 A1 | 3/2003 | Block et al. |
| 2003/0055780 A1 | 3/2003 | Hansen et al. |
| 2003/0061171 A1 | 3/2003 | Gilbert et al. |
| 2003/0069856 A1* | 4/2003 | Seifert ................. G06Q 20/00 705/73 |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0191709 A1 | 10/2003 | Elston et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0233318 A1* | 12/2003 | King et al. ....................... 705/39 |
| 2003/0233319 A1* | 12/2003 | Lawrence ....................... 705/39 |
| 2004/0007618 A1 | 1/2004 | Oram et al. |
| 2004/0015438 A1 | 1/2004 | Compiano |
| 2004/0024697 A1* | 2/2004 | Landa ................... G06Q 20/10 705/39 |
| 2004/0024701 A1 | 2/2004 | Hansen et al. |
| 2004/0039702 A1 | 2/2004 | Blair et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0083172 A1 | 4/2004 | Wiederin |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Mascavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0153410 A1* | 8/2004 | Nootebos ............... G06Q 20/12 705/44 |
| 2004/0158521 A1 | 8/2004 | Newton et al. |
| 2004/0164145 A1* | 8/2004 | Licciardello et al. ......... 235/381 |
| 2004/0167860 A1 | 8/2004 | Baxter et al. |
| 2004/0193897 A1 | 9/2004 | Van Volkenburgh |
| 2004/0205023 A1* | 10/2004 | Hafer et al. ...................... 705/43 |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0004702 A1 | 1/2005 | McDonald |
| 2005/0017607 A1 | 1/2005 | Weinberger |
| 2005/0080678 A1* | 4/2005 | Economy ............... G07F 7/0833 705/16 |
| 2005/0080728 A1 | 4/2005 | Sobek |
| 2005/0107152 A1 | 5/2005 | McGee et al. |
| 2005/0121517 A1 | 6/2005 | Igval et al. |
| 2005/0137948 A1 | 6/2005 | Kissner et al. |
| 2005/0167481 A1 | 8/2005 | Hansen et al. |
| 2005/0177505 A1 | 8/2005 | Keeling et al. |
| 2005/0177716 A1 | 8/2005 | Ginter et al. |
| 2005/0180500 A1 | 8/2005 | Chiang et al. |
| 2005/0187929 A1 | 8/2005 | Staggs |
| 2005/0209958 A1 | 9/2005 | Michelsen |
| 2005/0209961 A1 | 9/2005 | Michelsen |
| 2005/0251440 A1 | 11/2005 | Bednarek |
| 2005/0269415 A1 | 12/2005 | Licciardello et al. |
| 2006/0006224 A1* | 1/2006 | Modi ............................ 235/379 |
| 2006/0031160 A1 | 2/2006 | Villa |
| 2006/0124732 A1* | 6/2006 | Dentlinger ............. G06Q 20/04 235/380 |
| 2006/0144927 A1 | 7/2006 | Love |
| 2006/0167798 A1* | 7/2006 | Castrignano .................... 705/42 |
| 2006/0207856 A1 | 9/2006 | Dean et al. |
| 2007/0063021 A1 | 3/2007 | Chakiris et al. |
| 2007/0075129 A1* | 4/2007 | Hanna ................... G06Q 20/10 235/379 |
| 2007/0187484 A1 | 8/2007 | Cooper et al. |
| 2007/0214091 A1* | 9/2007 | Hansen ............... G06Q 20/027 705/64 |
| 2007/0215689 A1* | 9/2007 | Algiene ......................... 235/379 |
| 2008/0243690 A1* | 10/2008 | Paintin et al. .................... 705/44 |
| 2008/0288401 A1* | 11/2008 | Jones et al. ...................... 705/43 |
| 2009/0159695 A1 | 6/2009 | Licciardello et al. |
| 2010/0161485 A1* | 6/2010 | Bulawa et al. .................. 705/40 |
| 2011/0155799 A1* | 6/2011 | Meszaros et al. ............ 235/379 |
| 2013/0144734 A1* | 6/2013 | Perkins et al. .................. 705/18 |
| 2013/0339224 A1* | 12/2013 | Lykov ............................. 705/39 |
| 2014/0279228 A1* | 9/2014 | Fry et al. ..................... 705/26.41 |

FOREIGN PATENT DOCUMENTS

| | | |
|---|---|---|
| EP | 1077436 A2 | 2/2001 |
| EP | 1607916 A1 | 12/2005 |
| WO | 00/22559 A1 | 4/2000 |
| WO | 00/46725 A1 | 8/2000 |
| WO | 00/67177 A2 | 11/2000 |
| WO | 01/04816 A1 | 1/2001 |
| WO | 01059722 A2 | 8/2001 |
| WO | 02/05195 A1 | 1/2002 |
| WO | 02058017 A1 | 7/2002 |

OTHER PUBLICATIONS

Author Unknown, "More Consumers Pay Bills at Convenience Stores in Japan", Asia Pulse, Aug. 29, 1997, 1 page.
Author Unknown, "Verizon Customers Can Now Pay Bills at Verizon Plus Stores Nationwide", PR Newswire, Jan. 13, 2004, 2 pages.
European Patent Application No. 06815200.8, Supplementary Partial European Search report, 6 pages, Nov. 10, 2009.
Western Union Holdings, Inc., "Send Money by Credit Card", 2003, retrieved from www.moneytransfer/ie/creditcards.htm on Sep. 7, 2007, 1 page.
"Quarterly Report, 1st Quarter of the Western Union Telegraph Company"; 1978, 2 pages.

(56) References Cited

OTHER PUBLICATIONS

"Western Union Quick Collect"; 2004; 2 pages.
About Western Union: Company History; http://www.payment-solutions.com/history.html, 2005, 2 pages.
Aeromexico and Western Union Partner to Offer a Cash Payment Option for Booking Airline Tickets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Express Unit Introduces State-Of-The-Art Automated Money Order Dispenser; 1990, Tri-State Food News, 1 page.
AmeriNet, Inc.: "The Best Idea in Payment Systems since the Credit Card", http://www.debit-it.com/, printed Feb. 7, 2000, 8 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine-Second Money Order Dispenser; 1991, Post-News, vol. 17, No. 1, 1 page.
Andrejczak, Matt, "A Virginia start-up is reaching", Dialog File, American Banker-v164-date May 17, 1999, 2 pages.
Announcing Quick Collect Online; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company; 1873, pp. 8-11.
Annual Report of the President of the Western Union Telegraph Company; 1874, pp. 8-11.
Annual Report of the Western Union Corporation, 1990, 4 pages.
Annual Report of the Western Union Telegraph Co 1975, 3 Pages.
Annual Report of the Western Union Telegraph Company, 1940b, 4 pages.
Annual Report of the Western Union Telegraph Company; 1935, 2 pages.
Annual Report of the Western Union Telegraph Company; 1940, pp. 9 and 22.
Annual Report of the Western Union Telegraph Company; 194 7, 2 pages.
Annual Report of the Western Union Telegraph Company; 1949, 2 pages.
Annual Report of the Western Union Telegraph Company; 1951, 2 pages.
Annual Report of the Western Union Telegraph Company; 1981, 2 pages.
Annual Report of the Western Union Telegraph Company, 1953, 2 pages.
Annual Report of the Western Union Telegraph Company, 1954, 3 pages.
Annual Report of the Western Union Telegraph Company, 1973, 5 pages.
Annual Report of the Western Union Telegraph Company; 1974, 2 pages.
Annual Report of the Western Union Telegraph Company, 1978, 3 pages.
AT&T Wireless to Offer Western Union Swif!Pay as Replenishment Option for AT&T Free2Go Wireless Prepaid Customers; 2001, PR Newswire Association, 2 pages.
Behind the Scenes of Life; 1996, First Data Corporation Annual Report, 3 pages.
Bidpay.com: Whois search results; 2003, http://www.networksolutions.com/en US/whois/results.jhtml;jsessionid+VZDZVYDD 1 J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.

Bonen, Dan "Beaming Money by Email is Web's Next killer App", PR Newswire, Nov. 16, 1999, pp. 1-4.
Business Wire, "E-Commerce, Email and E-greeting Cards Combine in New Web Site Designed by OZ Interactive Bureau", Sep. 14, 1999 (abstract), [online] [retrieved on May 1, 2002], retrieved from PROQUEST Database, 2 pages.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
Confinity, Inc., PayPal.com, How PayPal.com Works, download from website http://www.paypal.com on Feb. 7, 2000, 7 pages.
Dotbank, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away—Don't Let Your Customers Go with Them: Announcing the Western Union Benefits Quick Cash Program; 1998, 4 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Get your Collect Card; 1939, Dots and Dashes, 2 pages.
Greenia—1952 Website computermuseum.li—Lexikon Services 1982 2002-2003 pp. 3.
Guess What? The check's not in the mail; 2001, Western Union's Professional Collector, 3 pages.
Hoffman, Karen Epper "PayPal Still Running Free, But thee-payments company's carefree days PW may be numbered if regulators decide its essentially a bank" Bank Technology News, published between 2001-2003, www.banktechnews.com/btn/articles/btnoct01-13.shtml, 3 pages.
How money by phone was paid; Money Transfer Service: Book of Rules and List of Offices; 1926, Western Union Telegraph Company, 3 pages.
Idealab company PayMecom printed date Feb. 16, 2000, 7 pages.
If you're not getting your payment with Quick Collect, chances are you're not getting it; 2001, 2 pages.
Inteii-A-Check Corp-http://www.icheck.com web site, printed date Feb. 7, 2000, 7 Pages.
Internet Article, "Send Money by Credit Card" available on Sep. 7, 2007 at http://www.moneytransfer.ie and copyright 2003.
Internet Article, "Western Union Money Transfer" available on Sep. 7, 2007 at http://www.moneytransfer.ie/SendReceive.htm and copyright 2003.
Introducing the Western Union Cash Card Program; 1998, 2 pages.
It takes a certain person to make a good collector. But it takes a good manager to make a champion; 2001, Western Union's Professional Collector, 3 pages.

(56) References Cited

OTHER PUBLICATIONS

Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar "PayPal Electronic Plan May be on the Money in Years to Come", The Wall Street Journal Interactive Edition, Nov. 15, 1999, downloaded from www.paypal.com/html/wsj.html, 2 pages.
Lawton, George; "Biometrics: A New Era in Security"; 1998, Computer, vol. 31, No. 8, pp. 16-18.
Leading Provider of Transaction Card Processing Selects Connect Oneserver Software as a Solution, http://www.oneserver.com web site, May 17, 1996, 5 pages.
Levin, Gary; "Western Union not fading into sunset; new services are added as telegrams drop"; 1992, 2 pages.
Loved one stranded? Send Cash; 1991, Akron Beacon Journal, 2 pages.
McEnaney, "Modular ATM Gives Boost to Diebold",—DIALCG File 01896530—Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
MoneyZap.com Greeting Card Process Flow; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
Netscape Announces netscape Livepayment to Facilitate Internet Commerce, May 13, 1996, 5 pages.
New Western Union SwiftPay Service Continues Expansion of Consumer to Business Payment Option, PR Newswire Association, Inc., Oct. 29, 1999 2 pages.
NTS Completes Merger with EDS Fleet Services; New First Data Unit Sets Sights on New Markets; 1996, NTS Press Release, 3 pages.
Pay Pal for the Palm; http://handheldnews.com/file.asp?ObjectiD=5401, Printed date Oct. 10, 2003; 2 pages.
PayPal.com Case Study; http://fox.rollins.edu/-slackman/PayPal.htm, 2003, 7 pages.
PayPal: The way to send and receive money online; 2002; 4 pages.
PayPai—News; http://www.ndrys.com/paypal.html, 2003, 3 pages.
PaySys signs up four Asian distributors; 1997 Orlando Business Journal, 3 pages.
Pilgrims Started Thanksgiving Custom; Dots and Dashes, vol. 4, No. 11, Nov. 1928, 2 pages.
Plotkin, Hal "Beam Me Up Some Cash" Silicon Valley Insider, Sep. 8, 1999, www.halplotkin.com/cnbcs029.htm, 3 pages.
PR Newswire Association, Inc., Western Union Financial Services forms, Aug. 22, 1991, 1 page.
PR Newswire, "GiftSpot.com Simplifies Gift-Giving on the Internet," Oct. 20, 1999(abstract), [online] retrieved on May 1, 2002], retrieved from PROQUEST Database, 5 pages.
Press Release: "Western Union Announces ATM Card Payout for Money Transfer Transactions"; 2001, U RL: http:/ /news. firstdata .com/media/ReleaseDetail.cfm?ReleaseI D=849995>.
Purchasing American Airlines Tickets Just Got Easier; 2005, 4 pages.
Quick Cash and Quick Collect: Western Union's money-movers; 1990, Newsbriefs, vol. 2, No. 1, 3 pages.
Quick Cash: A safe and reliable way to send funds around the world; http://www.paymentsolutions.com/quickcash.html, Nov. 3, 2005, 1 page.
Quick Collect Sales Presentation; Jan. 2004, 28 pages.
Quick Collect: Government/Child Support Agency Name, Training Guide; 2004, 7 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.
Rhode Island becomes first state to accept child support payments at Western Union: More than 50 Western Union Convenience Pay Agent Locations Offer New Level of Convenience to Rhode Island Residents Who Pay Child Support-; 2002, 3 pages.
SBC Communications adds Western Union Locations for Walk-in Customer Bill Payments; SBC News Release, Sept 7, 2005, 2 pages.
Send your payment using Western Union Quick Collect; Feb 2, 2004 2 pages.
Sending Cash in a Flash: There are more ways to do it than you might think; 1991, 2 pages.
Sending Cash in a Flash; 1990, Travel & Leisure, p. 42.
Shopping Order service and gift service; 1934, Western Union Telegraph Company, Money Order Book, 6 pages.
Signature Services: Helping financial institutions send funds faster; http://www.paymentsolutions.com/signature.html, 2005, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina "PayPal Online Payment Service—Another Way to Pay for Auction Items" www.auctionbytes.com, Feb. 20, 2000, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Stockel, Anna; "Securing Data and Financial Transactions"; 1995, Institute of Electrical and Electronics Engineers 29th Annual Conference, pp. 397-401.
Survey of services; 1960, pp. 2-31.
The Western Union Telegraph Company: Delivery of Money Transfer Service; Apr. 1926, Commercial Bulletin No. 9-A pp. 4.
The Western Union Telegraph Company: Instructions for Receiving Clerks; 1929, Commercial Bulletin No. 37-A, 2 pages.
The Yellow Blank is Correct for every social need; 1930, Western Union Booklet, 2 pages.
The Yellow Blank: When, Why, How to Use It; 1934, 5 pages.
Towson, MD., "VIPS Introduces MCSource to Managed Healthcare Industry", VIPS Healthcare Information Solutions, Mar. 7, 1996, 3 pages.
Transfers require ID made by telegraph; 1895, Tariff Book, 4 pages.
Trans Point, "The Way to Pay Online", downloaded from website http://www.transpoint.com/ on Feb. 10, 2000, 12 pages.
Tranz 330 Fast, "Low-Cost Transaction Automation At the Point of Service," http://www.vfifinance.com/tranz330.htm, VeriFone Finance, pp. 1-3, especially pp. 1-2, Jan. 1999.
VeriFone Finance, "Fast, Low-Cost Transaction Automation at the Point of Service", Jan. 1999—2 Pages.
Wermer, Sandra; "A million credit card transactions in five hours"; 1997, Primeur, 2 pages.
Western Union—Quarterly Report 3rd Quarter 1975—4 pages.
Western Union—"Now, using our service is even more rewarding" 2004, 4 pages.
Western Union and Continental Airlines Introduce New Quick and Easy Cash Payment Option When Booking Flights; 2004, Press Release, 4 pages.
Western Union Creates Phone Card with BL T Technologies; 1997, PR Newswire Association, 2 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Money Orders More Popular Than Ever, 1942, Dots and Dashes, vol. 18 No. 3, 2 pages.
Western Union Money Transfer & more, Jun. 10, 2003, 9 pages.
Western Union—Money Transfer Service—Feb. 1, 1920 10th Edi— pp. 119 & 120.
Western Union Money Transfer Services, Send Money Online, Money Orders, Printed date Nov. 3, 2005, 3 pages.

(56) References Cited

OTHER PUBLICATIONS

Western Union New Supplement: Money Orders delivery through Mailgram: 1975, 2 pages.
Western Union News Supplement: Automatic travelers checks using Western Union; 1975,2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: A Brief Description, 1960, 22 pages.
Western Union Quick Collect, "There's a lot to be said about the many advantages of the Quick Collect Service and look who's saying it", 1995, 4 pages.
Western Union Quick Collect: First Data Corporation; 2000-2001 ,2004; 2 pages.
Western Union Quick Collect: The Fastest way to collect good funds; 1999, 11 pages.
Western Union Quick Collect: The most agents, the most locations, the most experienced; 2000, 2 pages.
Western Union Shopping Order, 1933, 2 pages.
Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
Westwood, Mass, "Strean, LitleNet, BBN, and KPMG Announce Industry-Wide Initiative to Enable Wide-scale Software Electronic Commerce", Stream international Inc., and LitleNet, May 7, 1996, 7 page.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene "You've Got Money!", Bank Technology News, Jun. 2000, pp. 1-4, vol. 13, Issue 6, New York.
X.com, "Do More With Your Money", download from website http://www.x.com, 5 pages, Feb. 7, 2009.
XP-002347909-Western Union Announces ATM Card Payout for Money Transfer Transactions—Oct. 22, 2001, 1 page.
You're sending more than a payment: You're sending peace of mind; 2004, 3 pages.

\* cited by examiner

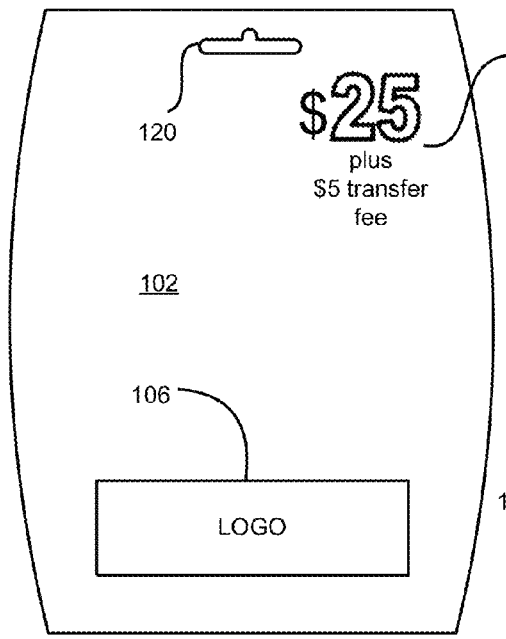
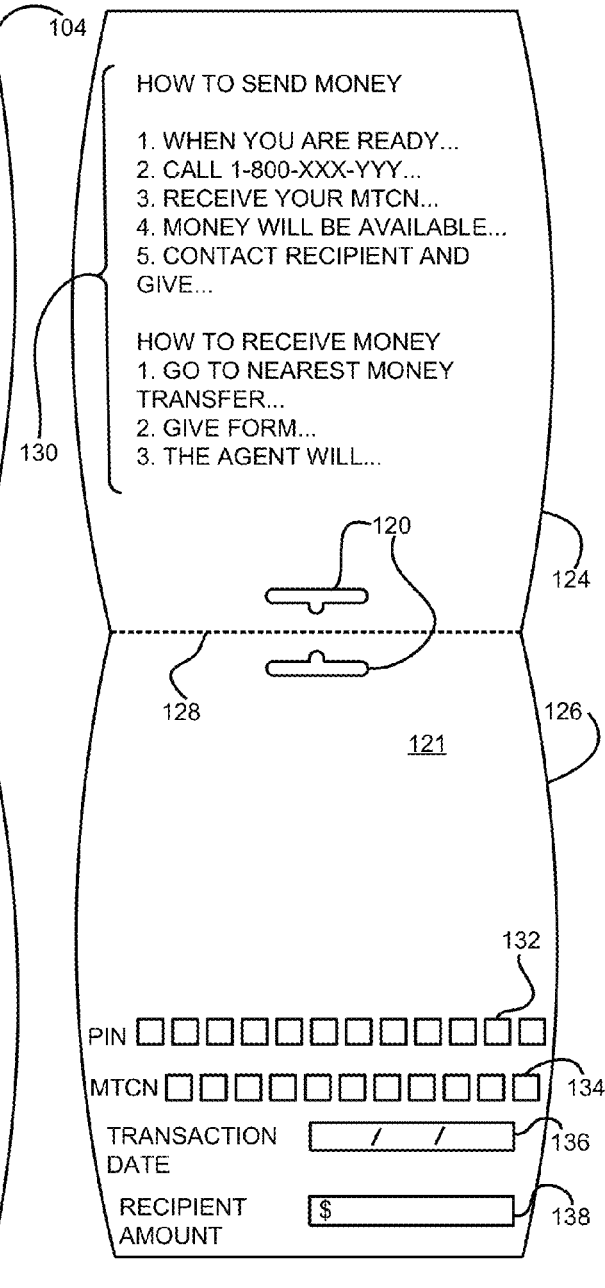
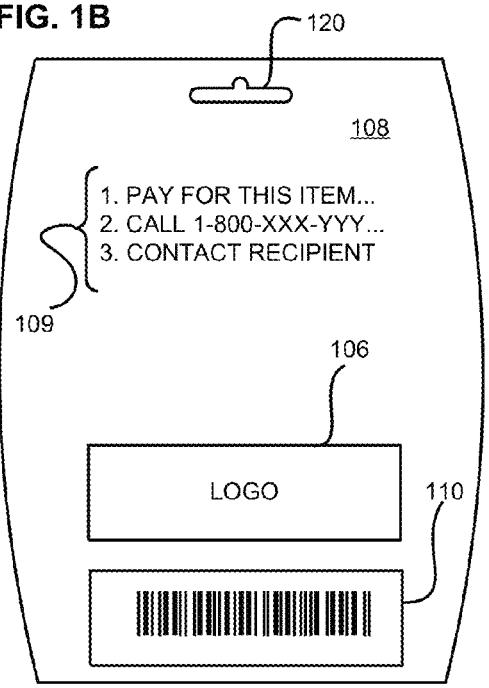

| UPC XXXXXXXXXX ($25) | |
|---|---|
| PIN | USED (Y/N) |
| XXXXXXXXXX | Y |
| XXXXXXXXXX | N |
| . | . |
| . | . |
| . | . |
| XXXXXXXXXX | N |

| UPC XXXXXXXXXX ($50) | |
|---|---|
| PIN | USED (Y/N) |
| XXXXXXXXXX | Y |
| XXXXXXXXXX | N |
| . | . |
| . | . |
| . | . |
| XXXXXXXXXX | N |

FIG. 3

MONEY TRANSFER SYSTEM AND METHOD

CROSS-REFERENCES TO RELATED APPLICATIONS

This application is a continuation of U.S. Pat. No. 8,672,220, issued on Mar. 18, 2014, filed as U.S. patent application Ser. No. 11/240,755 on Sep. 30, 2005, and entitled, "MONEY TRANSFER SYSTEM AND METHOD," the entire disclosure of which is hereby incorporated by reference, for all purposes, as if fully set forth herein.

This application is related to U.S. Pat. No. 7,641,109, issued on Jan. 5, 2010, filed as U.S. patent application Ser. No. 11/132,710 on May 18, 2005, and entitled, "MONEY TRANSFER CARDS, SYSTEMS AND METHODS," the entire disclosure of which is hereby incorporated by reference, for all purposes, as if fully set forth herein.

BACKGROUND OF THE INVENTION

The present invention relates generally to the field of money transfers, and in particular to instruments that may be purchased at retail locations in order to facilitate money transfer transactions.

Present money transfer procedures typically involve an individual going to a money transfer location, such as a Western Union office, and giving the customer service representative a variety of personal information. This personal information may include the names and addresses of the sender and recipient, proof of identification, and the amount to be transferred. This information is entered into a money transfer system, and is used to create a record of the money transfer. After the money to be transferred has been collected from the sender, the sender notifies the recipient of the transfer. The recipient usually then goes to a separate money transfer location, such as another Western Union location, to pick up the money. The recipient may be required to provide a money transfer number and/or proof of identification, prior to picking up the money.

Present procedures often discourage some customers from using money transfer systems. People who frequently send money using money transfer systems find that they need to make frequent trips to offices or locations designated for money transfers. Each visit requires that the sender provide personal information to the customer service representative at the time money is deposited. Even if a person does not frequently send money, it can be a burden to transfer money, since the customer has to first locate a money transfer location, and then take the time to visit the money transfer office, and provide the necessary personal information.

BRIEF SUMMARY OF THE INVENTION

There is provided, in accordance with embodiments of the present invention, methods and systems for providing money transfer instruments that may be purchased at retail locations, with a personal identifier (e.g., PIN) issued at a POS terminal at the time of purchase in order to facilitate later completion of a money transfer request.

In one embodiment, a method includes entering the product information from a money transfer instrument at a POS terminal at the retail location, and in response to entry of the product information, issuing a PIN separately from the money transfer instrument at the POS terminal so that no PIN appears on the instrument prior to purchase. In order to complete the money transfer request, money transfer information along with the PIN is later provided to a money transfer host system. A control identifier, e.g., a money transfer control number (MTCN), is provided by the host system to the sender in response to the money transfer information and PIN. The sender may then provide the MTCN to a recipient for use in receiving the transferred money.

BRIEF DESCRIPTION OF THE DRAWINGS

FIGS. 1A, 1B and 1C are front, rear and inside views, respectfully, of a money transfer instrument according to one embodiment of the invention.

FIG. 3 illustrates in simplified form a database for storing PINs used in connection with the money transfer instrument illustrated in FIGS. 1A through 1C.

DETAILED DESCRIPTION OF THE INVENTION

Figure 2:
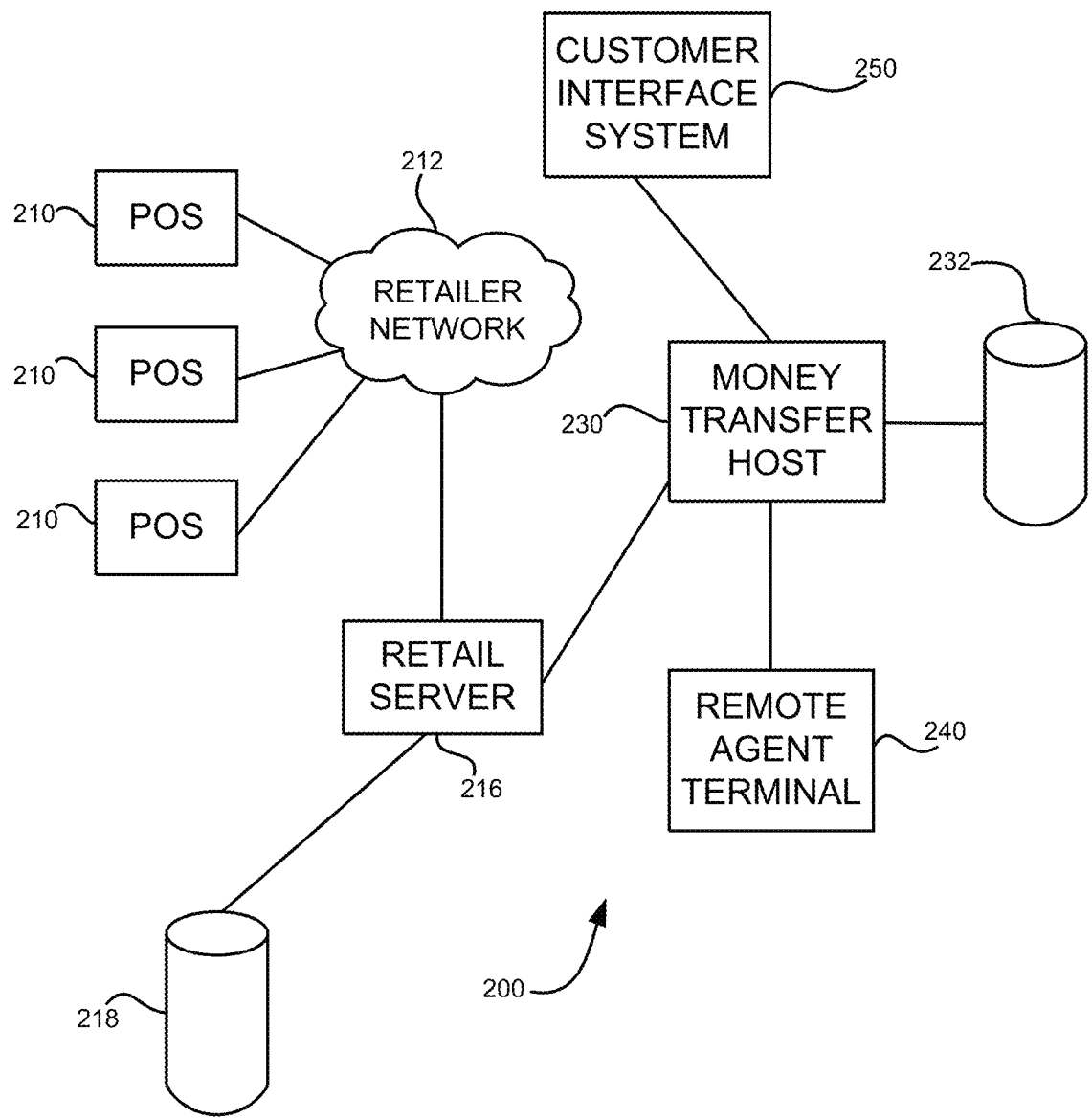
FIG. 2 illustrates a system for transferring money, using the money transfer instrument illustrated in FIGS. 1A through 1C.

Among other things, the present invention provides systems and methods for convenient transfers of money without a sender having to locate a money transfer office. Money transfers can be initiated by purchasing a money transfer instrument at a retail location, along with any other items being purchased at the retail location. As one example, money transfer instruments may be displayed for sale near the checkout lane of a retail grocery store, so that a person making grocery purchases may conveniently select a money transfer instrument and provide it along with other purchases/grocery items to the clerk for purchase at checkout. The customer need not go to a separate location or go to a money transfer representative to purchase the money transfer instrument. No personal information needs to be provided to the clerk to purchase the instrument, and the price of the instrument may be simply added to the total price of all items being purchased at the store.

It should be appreciated that the term "instrument" is used herein in its broadest sense, and may be implemented in many different tangible and intangible forms. For example, it could include (but is not limited to) a piece of paper, a folded card-like structure (as illustrated in FIGS. 1A-1C), a package, a smart card, a ticket or any other tangible item that may be selected by a customer and that bears product information (to be described below) that can be used to identify the instrument for purchase at a POS terminal. It could also be implemented in a virtual or intangible form, for example, product information that is displayed to a customer at a retail location, which information the customer takes and then presents to the POS terminal for purchase.

In one embodiment, the money transfer instruments each have a displayed face value or denomination, say $25, so that the customer knows the purchase price when the instrument is selected. A service or money transfer fee may also be displayed on the instrument, which may be added to the face value for the total purchase price. The instrument carries product identification (ID) information or data, e.g., in the form of a UPC code, that can be scanned and read at the POS terminal. Other forms of product ID could be employed, such as SKUs, printed product numbers and so forth, which may be manually entered by the clerk at the POS terminal, or product ID data electronically stored on a magnetic strip or smart card chip that may be read at the POS terminal. The instrument could also incorporate an RFID (Radio Frequency Identity) device that electronically transmits product data. The product data in each of these examples identifies the product and its purchase price so that a description of the money transfer instrument (and its cost) can, for example, be printed on a receipt along with any other items being purchased at the store.

In order for the customer to later complete the money transfer, a personal identifier is provided in response to purchase of the instrument. In some embodiments, the personal identifier is a PIN (personal identification number) printed on a receipt (or separately on another document) that can be later used by the customer, at a place and time convenient to that customer, to facilitate the collection of personal information by the money transfer system in order to fulfill or complete the money transfer request. As should be appreciated, the personal identifier or PIN could be any unique identifier (e.g., a string of numbers, letters or other characters) or set of identifiers.

The fulfillment of the money transfer request by the sender can be done in a number of different ways, to suit the convenience of the customer. In some embodiments, this can be done later (after purchase of the instrument) by the customer using a telephone (e.g., from the convenience of the customer's home) to call a money transfer provider and simply give the PIN and the necessary personal information (e.g., name of sender, name of recipient, pick-up location such as city, state or country, and so forth), to a customer service representative. Among other possibilities, the call could also be handled by an automated Interactive Voice Response (IVR) system using the key pad of a phone and/or voice responses in order to provide the PIN and any required personal information. In other embodiments, the customer (sender) can use a personal computer, PDA, wireless phone, WAP (Wireless Application Protocol) enabled phone or other terminal to enter required information at an internet website operated by the money transfer provider. In yet other embodiments, personal information could be entered at a self-service terminal (e.g., ATM) at a publicly accessible location. Of course, the personal information could also be presented in person at a money transfer office.

In embodiments where the customer has been given a PIN at the time of purchase, the PIN permits the money transfer system to later authenticate the customer and his purchase of the money transfer instrument when personal information is provided and the money transfer request completed.

In some embodiments of the invention, the customer (when fulfilling or completing the money transfer request) is provided with means to facilitate the receipt of the money by the recipient. This can be accomplished through the use of a control identifier, such as a money transfer control number (MTCN), which is provided to the sender after the PIN and personal information are provided to the money transfer system. As is the case with the PIN, the MTCN may also be any unique identifier (e.g., a string of numbers, letters or other characters), or could be a set of identifiers (e.g., that could be combined together to provide a unique identifier). The money transfer system generates the MTCN for the sender to provide to the recipient, e.g., when the sender informs the recipient that the money is available for pick-up. When the recipient then visits a money transfer location to pick-up the transferred money, the MTCN provides a convenient reference to permit a record of the transfer (including, e.g., the name of the recipient and the amount transferred) to be automatically retrieved at the money transfer location for cash payout to the recipient.

In some embodiments, the money transfer instrument purchased by the customer at a retail location is constructed to facilitate the use of the PIN and MTCN. For example, the instrument can be constructed so that upon receipt of the PIN (whether by being printed on a receipt or being provided in some other manner to the customer at the POS terminal), the customer may record the PIN on the instrument at a location that will be generally concealed from others. Likewise, when the same customer contacts the money transfer provider or system to complete the transfer request and receives an MTCN, that number can also be recorded on the instrument so as to be generally concealed from others, in order to minimize the risk of it being discovered and used by an unauthorized person.

Referring to FIGS. 1A, 1B and 1C, an exemplary money transfer instrument 100 is illustrated. The instrument 100 may be displayed for purchase at a retail location, such as a grocery store, convenience store, gas station, department store, etc. It is intended that instruments 100 may be offered for sale at any convenient retail location that a customer may visit to make purchases, so that the customer does not have to locate and make a separate trip to a dedicated money transfer office/station, or otherwise follow the traditional process used for depositing money for transfer.

The front side 102 of the instrument (FIG. 1A) is illustrated as having a face value (e.g., $25) printed prominently at a location 104, along with a service fee to be included in the purchase price (the service fee is the fee charged by the money transfer system for providing the money transfer service). The front of the instrument may also include a logo 106, as well as any other promotional or useful information (or graphics) for the customer to see when selecting the instrument 100.

The back side 108 of the instrument (FIG. 1B) carries simple instructions/explanations 109 for the purchaser to see when purchasing the instrument (to become generally familiar with how the instrument works) as well as a logo 106 (or other promotional information) and a UPC code 110. The clerk at the retail store may use an optical scanner at the POS terminal to read the UPC code in order to electronically retrieve product information or identification, including pricing information.

A slot 120 permits the instrument 100 to be hung from J hooks or the like at the retail store for convenient display to customers. As should be appreciated, the instruments may be displayed so that instruments having different denominations or face values ($25, $50, $100, etc.) may be selected by the customer. The UPC code 110 will correspond to the face value of the instrument so that the proper face value (and service fee) will be known to the POS terminal after the UPC code is scanned. In some embodiments, the instrument may not have a face value, but rather is loaded with any value chosen by the customer when the instrument is purchased. In such case, the clerk would not only scan the UPC code 110, but also be prompted at the POS terminal to enter the amount of money that is being loaded onto the instrument by the customer. The clerk would then collect the purchase price (loaded value plus service fee) from the customer.

In FIG. 1C, the inside 121 of the instrument 100 is illustrated, and as seen the instrument has two portions (an upper portion 124 and a lower portion 126, as viewed in FIG. 1C) that are joined at a fold line 128. When folded, the instrument has the appearance seen in FIGS. 1A and 1B, and when unfolded (for example, to have access to the inside of the instrument), it has the appearance seen in FIG. 1C. When unfolded to reveal the inside as in FIG. 1C, the instrument has more detailed instructions 130 for the customer to use after purchase, both for the purchaser to use in completing the transfer request and for the recipient to use in receiving cash (e.g., at a money transfer office). The inside of the instrument also includes a PIN recording location 132, an MTCN recording location 134, as well as spaces 136, 138 for entering the date of the transaction and the amount that the customer intends to transfer to the recipient (when a larger face value instrument is purchased, the purchaser may choose to initially transfer only a portion of the face value and later transfer the remainder to the same or a different recipient). While not shown, the instrument may have spaces for recording additional MTCNs, transaction dates and recipient amounts to facilitate record keeping in instances where not all of the face value will be transferred at one time. Thus, the instrument 100 could be used in a system where multiple transfers of money could be funded by a single instrument. Conversely, multiple instruments (and their PINs) could be aggregated for a single money transfer (receiving a single MTCN for several instruments).

Details concerning the system and method for generating and providing the PIN and MTCN will be described in greater detail later. Briefly, however, the PIN is generated at the time of instrument purchase, and may be provided to the customer on a receipt (see FIG. 7), or read by the clerk or by the customer from a display at the POS terminal. If the customer wants to retain a record of the PIN with the instrument 100 (for later use when fulfilling the money transfer request), he or she may record it on the inside of the instrument at location 132. If the customer receives a receipt (with the PIN) and chooses not to record the PIN on the instrument, then of course he may simply keep the receipt for later use when the PIN is needed (rather than writing it in space 132). When the customer is ready to complete the money transfer request (at his or her convenience and after purchasing the instrument), the customer contacts a money transfer provider, provides the PIN (and personal information concerning the transfer) and in response receives an MTCN which can later be provided to the recipient and then used to claim the money at a money transfer office. When receiving the MTCN, the customer can likewise record it on the instrument 100 (at location 134) so that all information concerning the transfer can be conveniently kept in one place.

It should be noted that the PIN and MTCN are recorded on the inside of the instrument 100 in order to keep them reasonably concealed when the instrument in folded. For added protection, the instrument may have a re-usable piece of adhesive tape, a locking tab or similar feature to keep the instrument securely fastened when folded (not shown). In such a way, the customer can be assured that the PIN or MTCN will not be easily seen and read by others who might otherwise try to access the instrument without the customer's authorization. Also, it should be appreciated that until the PIN is recorded on the instrument, the instrument does not display or otherwise carry the PIN. This prevents fraudulent use of the instrument prior to purchase, should it be removed from the retail location without paying for the instrument, by an unauthorized person who might otherwise attempt to use the instrument if a PIN were to appear somewhere thereon.

FIG. 2 illustrates a system 200 to facilitate the purchase of instruments 100, and to facilitate the completion of money transfers using those instruments.

As seen, the system 200 includes POS terminals 210 at the retail location where the instruments 100 may be purchased. For purposes of describing system 200, it will be assumed that each of the POS terminals 210 are located at a single retail location (grocery store, convenience store, department store, etc.), and are connected through a single retail network 212 at that retail location, although it should be appreciated that other arrangements are possible, including the POS terminals being located at different stores or even at different stores across independent store chains operating within different retail networks.

In the embodiment of FIG. 2, the retail store has a retail server 216 connected through network 212 to the POS terminals 210. Among other things, the server 216 may handle centralized inventory, price look-up and other database storage and retrieval functions using a database storage device 218. The retail server 216 is connected via a dedicated or public network (internet, PSTN, etc.) to a remote money transfer host 230 operated by an entity that provides money transfer services and manages money transfer transactions (e.g., Western Union). The money transfer host 230, among other things, manages data stored in an associated database 232 that is used in connection with transfers of money. The money transfer host 230 may be accessed by money transfer representatives or agents through the use of remote agent terminals 240 (located, for example, at money transfer offices at locations remote from the host 230). Only one terminal 240 is illustrated in FIG. 2, but it should be appreciated that there could in practice be many such agent terminals, located across a network of money transfer offices where customers may be depositing or receiving money.

In addition to the agent terminal 240, the money transfer host 230 may also be accessed directly by customers through a customer interface system 250 (to be described in greater detail later).

The database 232 stores, among other things, records and data relating to money transfer transactions (completed or yet to be completed). It also stores PINs that may be issued to customers purchasing money transfer instruments 100. For each type of money transfer instrument (e.g., for each instrument having the same face value), there may be associated one UPC code and a plurality of PINs stored in database 232. This is illustrated in FIG. 3, which shows, as one example, two groups of PINs in database 232, one group corresponding to a UPC code for instruments having a face value (denomination) of $25 and a second group corresponding to a UPC code for instruments having a face value of $50. While not shown, additional groups of PINs will be stored corresponding to each denomination, as well as each other instrument classification or category (e.g., determined by instrument brand, promotional theme, etc.). The PINs are stored in a database field 310. The stored PINs are each also marked with a designator bit or data indicating whether or not the PIN has been assigned to a customer ("used"). The designator for each PIN is stored in a field 312.

The PINs stored in database 232 are periodically assigned as needed to the retail server 216 (as well as other retail servers that serve POS terminals where instruments may be purchased), where they are in turn made available for issuance to customers purchasing money transfer instruments. Thus, either at regular intervals (e.g., at the beginning of each day) or upon request of the server 216 when its supply of PINs is low or depleted, PINs within database 232 are downloaded through host 230 and retail server 216 for storage in database 218. Thereafter, when a UPC code is scanned for an instrument at one of the POS terminals 210, the retail server provides a PIN corresponding to that UPC code to the POS terminal where, for example, it may be printed on a receipt after the purchase is completed. When a PIN is issued, the retail server sends a data indicator (along with the corresponding PIN) to the money transfer host database 232 to indicate that that particular PIN has now been issued or used ("Y" in field 312 if the PIN has been assigned). After the money transfer request has been completed by a customer and a MTCN has been issued, the PIN is normally no longer needed by the customer and the PIN may be designated as no longer used ("N" in field 312).

Returning to FIG. 2, when the customer desires to complete the money transfer request (having purchased an instrument 100 at a retail location), the customer may access the money transfer host 230 through the customer interface system 250. The system 250 may provide several different user interfaces for the customer to use. As mentioned earlier, one such interface may use a telephone network, with the interface system 250 employing an Interactive Voice Response system so that a customer may dial into the system 250 and then enter the PIN in response to a voice prompt. Other personal information may also be entered (sender/recipient names, dollar amount to be transferred, etc.) using a telephone keypad or other means. In response to the entry of the PIN and personal information, the host system creates a record of the money transfer transaction in data base 232 and assigns the MTCN for that record, which may be provided in an audio message to the sender.

Alternatively, the interface system 250 may include a web-based application, which the sender accesses using the internet and which provides instructions and data entry displays for entering the PIN and personal data, and in response provides the MTCN. Other methods for providing the PIN and personal data are also possible, such as sender visiting a money transfer office and providing the PIN in person (especially for customers who are uncomfortable using a telephone or web-based system).

While the money transfer host 230 (and its associated database 232) in FIG. 2 is described above as storing and managing both PINs and MTCNs, it should be appreciated that there may be more than one host. For example, PINs may be managed and stored at a separate PIN host (not shown) connected to retail server 216, and money transfer host 230 may manage and store data for other purposes (including managing money transfer transactions, issuing MTCNs, etc). Further, while the embodiment of FIG. 2 illustrates the PINs as stored for use at retail server 216 (where individual PINs are then provided to the POS terminal), such PIN functions (e.g., providing individual PINs to the POS terminal) could also be performed at the separate PIN host or even at the money transfer host 230.

Also, while FIG. 2 illustrates a plurality of POS terminals 210 connected to retail network 212, retail server 216 and database 218, it should be appreciated that at some retail locations (for example a small store having a single POS terminal), all the functionality described in connection with network 212, server 216 and database 218 could be resident at the single POS terminal. Thus, the POS terminal would have sufficient memory to not only perform price look-up and similar retail functions, but also receive and store groups of PINs (from money transfer host 230) and assign those PINs individually as instruments 100 are purchased.

Figure 4:
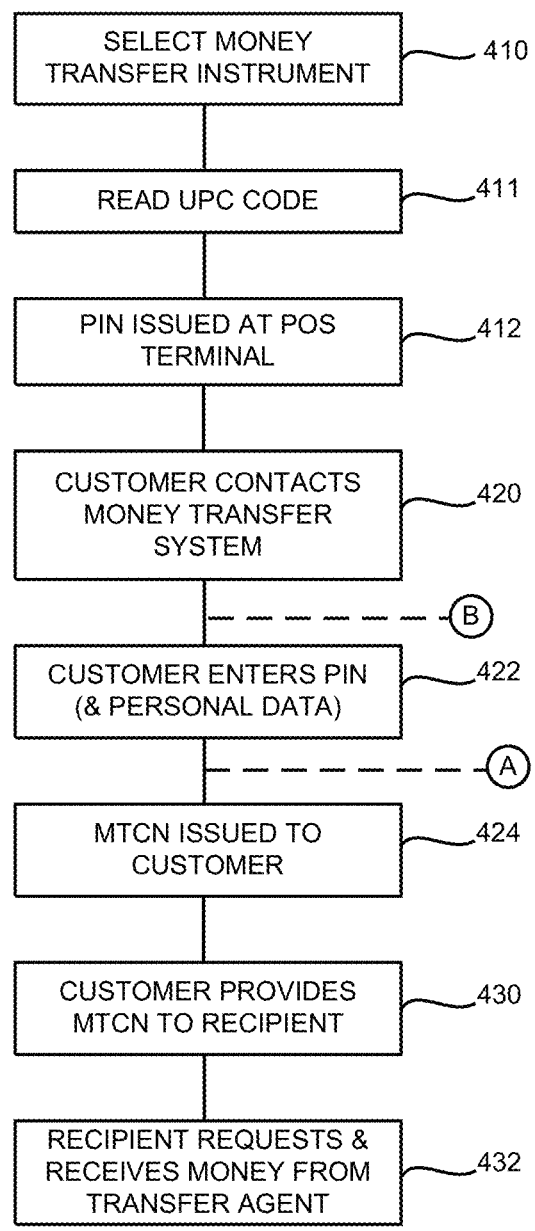
FIG. 4 is a flow diagram illustrating the operation of the system of FIG. 2.

Referring now to FIG. 4, a flow diagram illustrates one method for carrying out the operation of the system 200 (FIG. 2). The various steps of the illustrated process may be carried using software programs resident primarily at POS terminal 210, retail server 216 and money transfer host 230. At step 410, the customer at a retail location has selected a money transfer instrument for purchase and has taken it to a POS terminal 210 at a retail store checkout lane. The UPC code on the instrument is read, step 411, and after the customer has paid for the instrument (and other purchased items) a receipt is printed with a PIN that has been issued at the POS terminal (step 412). Later, when the customer is ready to complete the money transfer request, the customer contacts the money transfer host or system (through the customer interface system 250, FIG. 2) at step 420 and provides the PIN that was earlier issued by the POS terminal as well as necessary personal information concerning the transfer (step 422). In response to the PIN and personal data, the money transfer host creates a record of the transaction and issues a MTCN, step 424. When the customer is ready for the recipient to pick-up the cash, he provides the MTCN to the recipient (step 430). The recipient then visits a money transfer office or agent, provides the MTCN (and any necessary identification) and is provided the cash (step 432).

It should be appreciated that although not described in connection with FIG. 4, the recipient may receive value other than cash when presenting the MTCN. For example, the recipient may receive a stored value or other payment card, coupons for later redemption (at a store or other location), or directly transfer the monetary value to a third party for bill payment (utility bill credit card bill, etc.).

Figure 5:
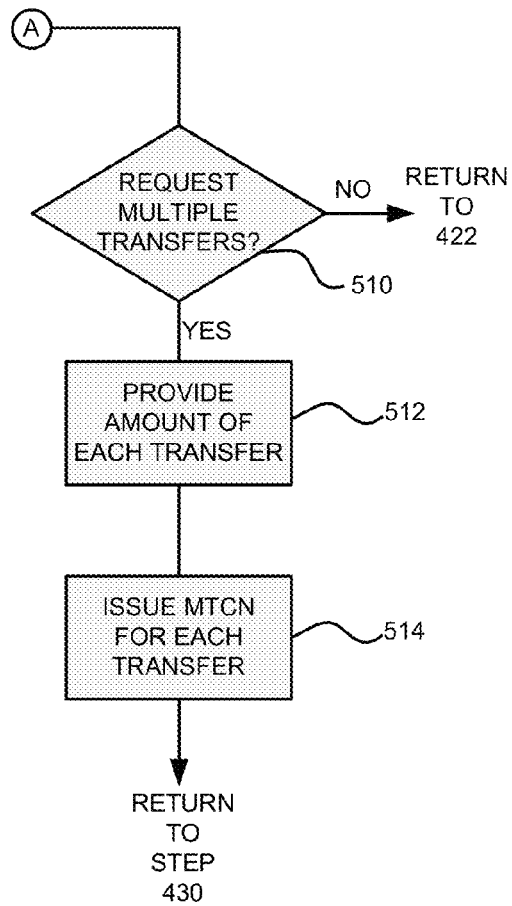
FIGS. 5 and 6 illustrate optional steps in the flow diagram of FIG. 4.
Figure 6:
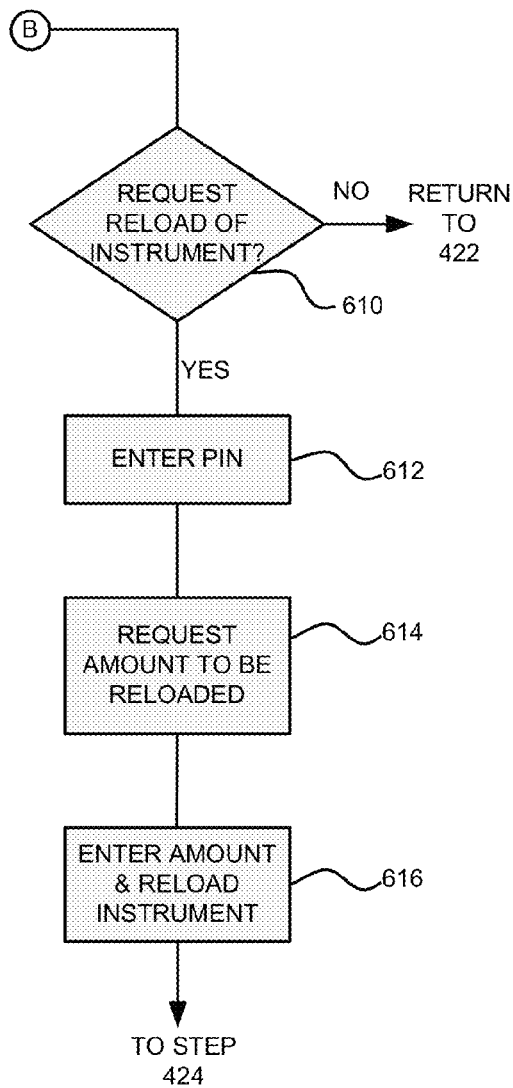

There may be additional features provided by the system 200 for transferring money, two examples of which are illustrated in FIGS. 5 and 6. As illustrated in FIG. 5 the customer may want to make multiple transfers (to the same or different recipients). After step 422 (FIG. 4), if the customer requests multiple transfers (step 510), the customer provides the amount of each transfer (along with personal data), step 512, and then the host system 230 may issue a separate MTCN for each such transfer to take place, step 514. Each MTCN is then later provided by the customer to the intended recipient.

In FIG. 6, the money transfer instrument may be re-used (i.e., reloaded), for example, after all the money associated with an instrument has been transferred. In such a case, the PIN associated with the instrument may be kept and re-used (rather than being marked as no longer in use in field 312, FIG. 3). After the customer has accessed the money transfer host at step 420 (FIG. 4), the customer may be asked if he desires to reload the instrument (step 610), and if so, he enters the PIN issued at the POS terminal and that was used for earlier transfer(s), step 612. The system asks the customer for the amount to be reloaded onto the instrument, step 614, which the customer provides at step 616 (using a credit card or other means for paying for the reloaded value). If the customer wants to then proceed with a new transfer and receive a new MTCN, the process returns to step 424 in FIG. 4.

In cases where a instrument is reloaded, the PIN remains associated with the instrument even after money transfers have taken place and the instrument's value is depleted. To prevent misuse, the host 230 can be programmed to permit PINs to be maintained only for a predetermined period of time (e.g., ending when the instrument remains un-used for a period of time, say six months, or after an established time limit, say one year from the date of original purchase).

Figure 7:
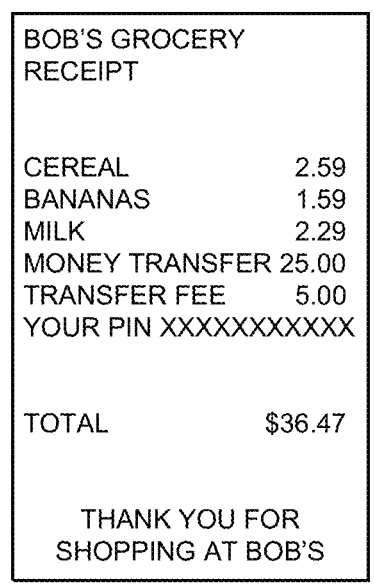
FIG. 7 illustrates a receipt provided to a customer and displaying a PIN issued after purchase of a money transfer instrument.

FIG. 7 illustrates an exemplary receipt that might be printed at POS terminal 210 in response to the purchase of a money transfer instrument 100. As seen in FIG. 7, the receipt shows each of the items purchased (and its cost) at a retail location, including a description of the money transfer instrument (a $25 instrument in the illustrated example) and the money transfer fee ($5 in the illustrated example). Printed immediately below the description of the money transfer instrument and the transfer fee is the PIN to be used by the customer when completing the money transfer request.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
providing, at a point of sale terminal, a money transfer instrument having product information and a monetary value associated therewith and used by a sender for transferring money to a recipient;
capturing, by the point of sale terminal, the product information of the money transfer instrument in response to the sender purchasing the money transfer instrument;
generating and issuing to the sender, by a money transfer host, in response to capture of the product information, a first identifier on a receipt printed at the point of sale terminal;
receiving by the money transfer host, after issuing the first identifier, money transfer information and the first identifier;
generating and providing to the sender, by the money transfer host, in response to receipt of the money transfer information and first identifier, a second identifier that is separate from the first identifier;
receiving from the recipient, by the money transfer host, the second identifier, the second identifier having been provided to the recipient by the sender; and
causing, at least partially by the money transfer host, funds to be provided to the recipient, in response to receipt of the second identifier.

2. The method of claim 1, wherein:
the money transfer instrument has a monetary value associated therewith; and
causing funds to be provided to the recipient comprises causing funds in an amount corresponding to the monetary value to be provided to the recipient.

3. The method of claim 1, wherein the method further comprises:
providing the money transfer instrument at a retail location.

4. The method of claim 3, wherein:
the money transfer instrument comprises instructions for the sender on completing a money transfer using the money transfer instrument.

5. The method of claim 1, wherein:
the money transfer instrument comprises at least one blank for the sender to write in the first identifier and/or the second identifier.

6. The method of claim 1, wherein:
the second identifier is provided to the recipient by the sender.

7. The method of claim 1, wherein causing funds to be provided to the recipient comprises:
providing a first portion of funds to be provided at a first time; and
providing a second portion of funds to be provided at a second time.

8. The method of claim 1, wherein causing funds to be provided to the recipient comprises:
causing a selection from a group consisting of the following to be provided to the recipient:
cash;
a stored value card;
a coupon; and
payment of a bill.

9. The method of claim 1, wherein the method further comprises:
receiving, by the money transfer host after funds have been provided to a recipient, an indication that the sender has provided additional funds; and
associating, by the money transfer host, the additional funds with the money transfer instrument.

10. The method of claim 9, wherein the method further comprises:
associating, by the money transfer host, a new money transfer control number with the additional funds.

11. A non-transitory machine readable medium having instructions stored thereon, the instructions executable by one or more processors for at least:
providing a money transfer instrument having product information and a monetary value associated therewith and used by a sender for transferring money to a recipient;
capturing the product information of the money transfer instrument in response to the sender purchasing the money transfer instrument;
generating and issuing to the sender, in response to capture of the product information, a first identifier on a receipt printed;
receiving, after issuing the first identifier, money transfer information and the first identifier;
generating and providing to the sender, in response to receipt of the money transfer information and first identifier, a second identifier that is separate from the first identifier;
receiving from the recipient, the second identifier, the second identifier having been provided to the recipient by the sender; and
causing funds to be provided to the recipient, in response to receipt of the second identifier.

12. The non-transitory machine readable medium of claim 11, wherein:
the money transfer instrument has a monetary value associated therewith; and
causing funds to be provided to the recipient comprises causing funds in an amount corresponding to the monetary value to be provided to the recipient.

13. The non-transitory machine readable medium of claim 11, wherein causing funds to be provided to the recipient comprises:
providing a first portion of funds to be provided at a first time; and
providing a second portion of funds to be provided at a second time.

14. The non-transitory machine readable medium of claim 11, wherein the instructions are further executable for at least:
receiving, after funds have been provided to a recipient, an indication that the sender has provided additional funds; and
associating the additional funds with the money transfer instrument.

15. The non-transitory machine readable medium of claim 14, wherein the instructions are further executable for at least:
associating a new money transfer control number with the additional funds.

16. A system comprising:
a point of sale terminal configured for at least:
providing a money transfer instrument having product information and a monetary value associated therewith and used by a sender for transferring money to a recipient;

capturing the product information of the money transfer instrument in response to the sender purchasing the money transfer instrument;

generating and issuing to the sender, in response to capture of the product information, a first identifier on a receipt printed;

a money transfer host system configured for at least:
receiving, after issuing the first identifier, money transfer information and the first identifier;
generating and providing to the sender, in response to receipt of the money transfer information and first identifier, a second identifier that is separate from the first identifier;
receiving from the recipient, the second identifier, the second identifier having been provided to the recipient by the sender; and
causing funds to be provided to the recipient, in response to receipt of the second identifier.

17. The system of claim 16, wherein:
the money transfer instrument has a monetary value associated therewith; and
causing funds to be provided to the recipient comprises causing funds in an amount corresponding to the monetary value to be provided to the recipient.

18. The system of claim 16, wherein causing funds to be provided to the recipient comprises:
providing a first portion of funds to be provided at a first time; and
providing a second portion of funds to be provided at a second time.

19. The system of claim 16, the money transfer host system is further configured for at least:
receiving, after funds have been provided to a recipient, an indication that the sender has provided additional funds; and
associating the additional funds with the money transfer instrument.

20. The system of claim 19, the money transfer host system is further configured for at least:
associating a new money transfer control number with the additional funds.

* * * * *